331-98

SEARCH ROOM

Jan. 26, 1960 O. I. HASZARD 2,922,957

TUNABLE MICROWAVE APPARATUS

Filed Jan. 21, 1955

INVENTOR.

OWEN I. HASZARD

BY Kenway, Jenney, Witter + Hildreth,

ATTORNEYS.

United States Patent Office 2,922,957

Patented Jan. 26, 1960

2,922,957

TUNABLE MICROWAVE APPARATUS

Owen I. Haszard, Wenham, Mass., assignor to Amerac Incorporated, Wenham, Mass., a corporation of Massachusetts Application January 21, 1955, Serial No. 483,291

5 Claims. (Cl. 331—98)

The present invention relates to microwave apparatus, and more particularly to tuning elements for use in cavity resonators, oscillators, amplifiers, wavemeters and the like.

In microwave apparatus, particularly such devices as are required to be adjustable in operating frequency, various forms of tuning arrangements have been heretofore employed. Such microwave apparatus as oscillators, resonators and the like generally employ cylindrical structures, for example a sleeve or cylinder, or a plurality of sleeves coaxially arranged, which define a cavity resonant at some predetermined frequency. Customarily the sleeve structure is provided adjacent one end with means that permits the longitudinal electrical dimensions of the cavity to be varied, in order to tune the cavity.

In one form of tuning element, a sliding electrical contact member is employed, serving as a movable end plate or plug to provide a radio frequency (R.F.) path across the cavity walls. Such element likewise provides a direct electrical connection (D.C. path) between walls. The problem with such form of tuning element is to insure good electrical contact at all times, so as to avoid sparking or arcing.

Another form of tuning element is the so-called non-contacting plunger, wherein a plug element is employed that does not involve a direct electrical connection or sliding contact. Instead, a non-contacting relatively thick plunger approximately a quarter-wavelength long at the desired operating frequency may be used, or a choke-type plunger. For many applications, however, such devices do not provide satisfactory operation over a sufficiently wide frequency range.

The present invention accordingly has as an object the provision of novel and effective tuning means for microwave devices of the cavity type, both coaxial and waveguide, wherein highly efficient operation may be obtained over a very substantial frequency range.

More particularly, it is an object of the invention to provide tuning elements for microwave devices wherein the element is non-contacting yet does not depend on quarter-wavelength dimensions or other forms of tuned choke means to achieve the requisite short-circuiting of the cavity to R.F. at the operating frequency.

Still another object of the invention is to provide tunable cavity apparatus of novel construction and arrangement, wherein efficient operation over a wide frequency band is afforded in a compact readily adjustable construction well suited for cavity oscillators, wavemeters and the like.

A further object of the invention involves the provision of a cavity oscillator construction wherein the vacuum tube mounting is integrated with the cavity in such fashion as to afford an extremely compact and efficient arrangement which nevertheless facilitates rapid and convenient installation and removal of the tube.

With these and other objects in view, one of the several features of the invention involves the provision, for use in cavity oscillators, wavemeters and the like, of a tuning element of composite construction embodying conductive and dielectric material, with the dielectric material intermediate the cavity walls and the conductive material to provide capacitive reactance sufficient to constitute an effective short circuit to R.F. energy across the cavity while preventing direct electrical contact.

More specifically, the invention contemplates, in cavities for microwave devices, the use of a tuning element or plunger, which may be either fixed or adjustable in position, employing a conductive body having a relatively thin film or layer of high dielectric constant insulating material intermediate the conductive body and the walls of the cavity. The dielectric thickness and area are such as to provide a relatively low impedance path to R.F. energy in the operating region of the device, while avoiding excessive coupling at lower frequencies, and not dependent on direct electrical connections or sliding contact.

Still another feature of the invention invloves a tube mounting for cavity oscillators and the like, wherein a planar type tube having an anode flange and grid ring may be mounted in the cavity while requiring a grid sleeve diameter only slightly larger in internal dimensions than the body diameter of the tube adjacent the grid ring.

Still another feature of the invention concerns a tunable cavity oscillator having a wide frequency range, wherein an iris or aperture is provided to afford anode to grid feedback of proper magnitude over the relatively wide tuning range of the oscillator.

The invention likewise involves the several features and details of the microwave cavity devices hereinafter described, and illustrated in the accompanying drawings showing the invention in a preferred embodiment. In these drawings—

Figures 2, 3:
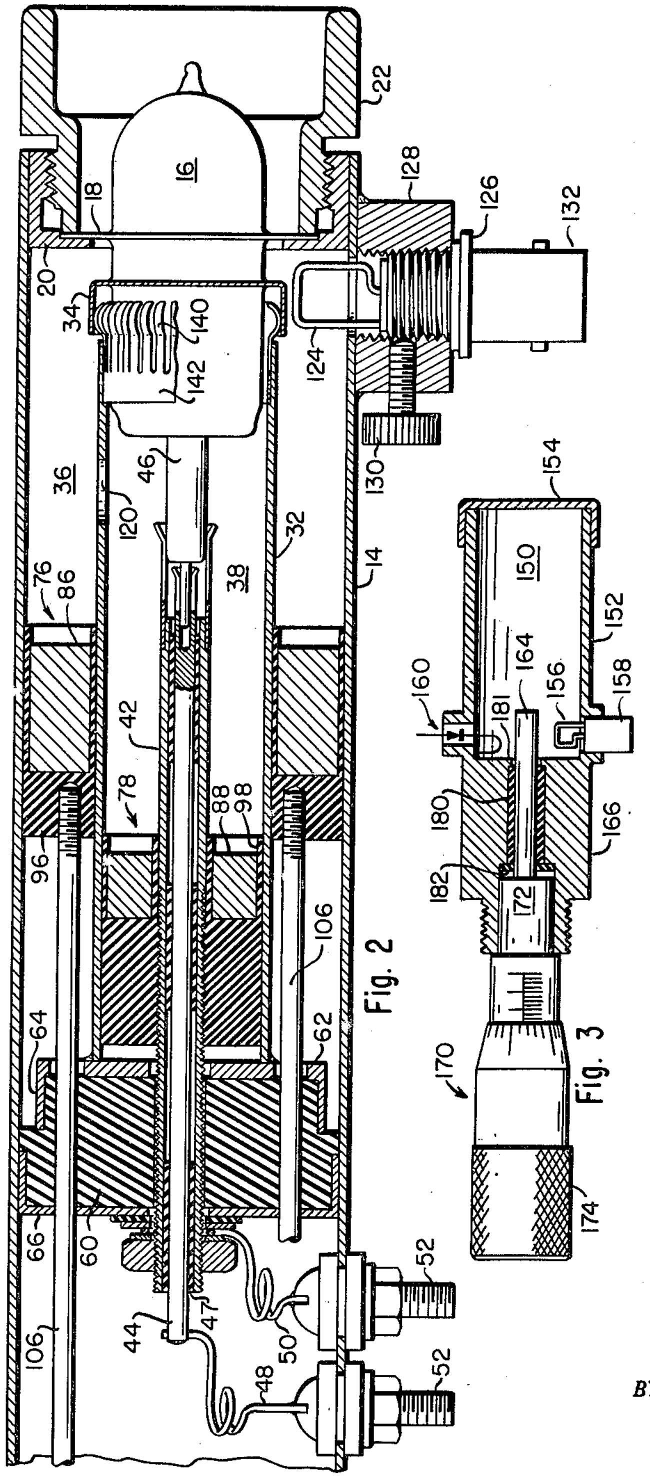
Fig. 2 is a longitudinal sectional view of the right hand portion of said appaartus, on a somewhat enlarged scale.
Fig. 3 is a longitudinal sectional view of a wavemeter employing a tunable cavity embodying the invention.
Figure 1:
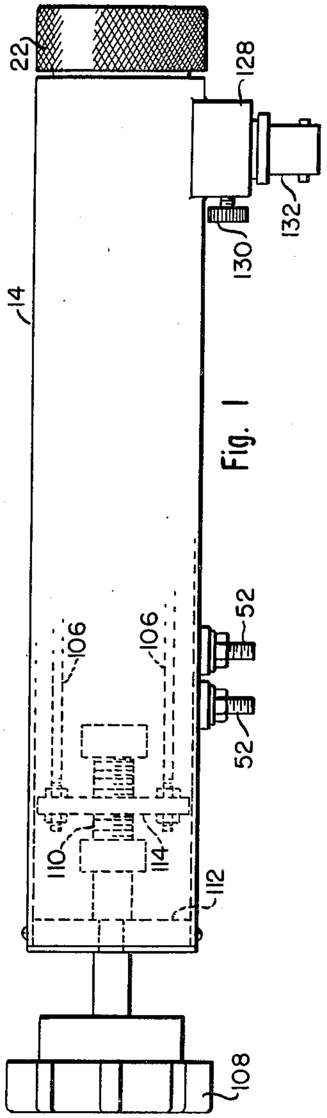
Fig. 1 is a longitudinal plan view of a cavity oscillator, showing the external configuration thereof.

The embodiment of the invention in a cavity oscillator will first be described. Referring to Figs. 1 and 2, the oscillator comprises a cylindrical body 14 which forms the anode sleeve of the apparatus. The vacuum tube 16 is mounted at the right hand end, the anode flange 18 of the tube being seated on the anode flange supporting ring 20 and clamped by clamp ring 22. The tube is of the so-called planar type, for example a type 2C36 triode.

The grid sleeve of the cavity oscillator assembly is indicated at 32, and has a diameter only slightly larger than the diameter of the envelope of the triode inwardly of the grid ring 34. The grid sleeve 32 is concentric with the anode sleeve 14 to provide coaxial cavities, the annular anode grid cavity 36 between body 14 and grid sleeve 32, and the cathode-grid cavity 38 within the grid sleeve 32.

The cathode connection to the tube and the supply of heater current are provided by cathode sleeve 42 and center rod 44. The rod is formed with resilient sleeve sockets to receive the cathode terminal 46 and concentric heater pin of the vacuum tube when the latter is mounted in the oscillator. The other side of the heater is returned through the cathode sleeve 42 and cathode terminal 46 in accordace with usual practice. Insulating bushings 47 isolate the central rod 44 from the cathode sleeve 42. Connections from the rod and sleeve are made by flexible leads 48 and 50 to terminals 52 mounted in insulated bushings and extending outwardly of the body 14.

The grid sleeve 32, the cathode sleeve 42 and the filament rod 44 are supported centrally of the anode sleeve by means of an insulating support in the form of a thick block 60 of suitable relatively rigid insulating material. This washer may advantageously be a tetrafluorethylene polymer having a dielectric constant somewhat greater than 2. Such a material is commonly identified by the trademark Teflon. Other dielectric materials of high insulating properties may also be utilized, such as polystyrene or polyethylene.

To support the grid sleeve on the insulating block 60, the sleeve 32 is secured, as by silver soldering, to a grid sleeve mounting plate 62. This plate preferably includes a cylindrical portion 64 to surround a portion of the block 60 for positive centering support. A back plate 66 engages the other face of the block, with a circumferential flange fitting snugly within the body 14 for positive mechanical positioning and good electrical contact with the body. Clearance is provided for the cathode sleeve 42 where it passes through back plate 66 and grid sleeve mounting plate 62, and an insulating washer isolates the cathode connections from the back plate.

In accordance with usual practice the resonant frequency of the oscillator is adjusted by varying the longitudinal dimensions of the cavities. For this purpose, shorting plungers or plugs are employed. While conventional devices make use either of actual sliding contact plungers with resilient fingers or the like, or noncontacting plungers of the choke type, the present invention employs novel tuning means that permits effective tuning over a wide range of frequency, while affording noise-free operation as well as freedom from arcing or sparking.

In the illustrative embodiment, the tuning plunger for the anode cavity 36 is indicated at 76 while the tuning plunger for the grid cavity 38 is indicated at 78. Both plungers are of annular configuration, with the anode tuning plunger 76 surrounding the grid sleeve 32 within the anode cavity, while the cathode tuning plunger 78 surrounds the cathode sleeve 42 and terminates the grid cavity 38.

The tuning plungers embody an insert of conductive material such as brass, suitably plated with silver or the like for maximum surface conductivity. The inserts are mounted within tuning plunger shells of high quality insulating material such as the tetrafluorethylene polymer (Teflon) previously referred to. The metallic insert for the anode tuning plunger is indicated at 86 and that for the cathode plunger at 88.

As heretofore indicated, the tuning plungers of the present invention depend for their operation on the effective by-passing of energy at microwave frequencies. Such by-passing is provided by the capacity between the inserts and the walls of the respective cavities. The shells 96 and 98 are provided with thin sleeve portions that extend between the metallic inserts and the cavity walls to form coaxial capacitors of small capacity, but sufficient to afford relatively low impedance, of the order of an ohm or less, at frequencies above 1000 mc. To minimize the hazard of arcing or sparking across the gap, the sleeve portions of the dielectric insulating material extend a short distance beyond the metallic inserts in the plungers, so as to lengthen very considerably the air gap.

To control the resonant frequency of the anode cavity, the anode plunger is arranged to be longitudinally adjustable. Rods 106 are arranged to slide through the back plug 60, with clearance at the plate 62, and to be threaded into the thickened end of the insulating shell 96 of the anode tuning plunger. These rods are actuated from outside the apparatus by knob 108, which rotates a tuning screw 110 free to rotate but axially restrained within end plate 112. The rods 106 are secured to a threaded fitting 114 which is caused by rotation of the tuning screw to advance or retract the tuning plunger along the cavity to vary the frequency thereof in accordance with conventional practice.

The cathode tuning plunger is likewise adjustable within the grid-cathode cavity. For this purpose the shell 98 is internally threaded so that its position along the cathode sleeve may be varied to set the cathode plunger in a position that places the grid cavity resonance approximately at the midpoint of the desired band or frequency range for the oscillator. Once the cathode plunger is set, which may be done during assembly, tuning of the oscillator within the desired range is achieved by the external knob, controlling the tuning of the anode cavity. By reason of the effective by-passing afforded by the integral coaxial capacitors of the tuning plungers, the oscillator is capable of providing relatively uniform output over an extended frequency range, as compared with devices employing conventional forms of tuning plungers.

Alternatively, the cathode tuning plunger may be made adjustable externally of the apparatus, in the same fashion as the anode plunger, so that both plungers may be adjusted for extremely wide range control of frequencies, relying on the by-passing characteristics of the tuning plungers to provide the substantial equivalent of a theoretically perfect plug or plunger over the entire frequency range of the cavity.

By way of example, the dielectric sleeves between insert and cavity walls may have a thickness of the order of 0.01″, resulting in a total capacity of the two condensers in series (between body and insert, and between insert and grid sleeve) of the order of 10 micromicrofarads. The shunting capacity provided across the cathode tuning plunger may be of the same general magnitude for effective by-passing.

To feed energy from the anode cavity into the grid-cathode cavity, so as to sustain oscillations, an opening 120 is provided in the grid sleeve. This opening provides the coupling required for positive feedback from the plate or anode circuit into the grid-cathode circuit.

For coupling to the oscillator, a loop 124 extends into the anode cavity 36. This loop is supported on a fitting 126 which is screw-threaded into a mounting 128 on the oscillator body. Set screw 130 serves to lock the fitting with the loop in adjusted coupling position. The outer end of the fitting may carry a standard coaxial connector 132 for coupling the oscillator output to a suitable line.

It will be observed that the grid ring 34 of the vacuum tube 16 is connected to the grid sleeve 32 by a plurality of resilient contact fingers 140 extending from a common base portion 142. This base portion 142 fits within and is bonded to the end of the grid sleeve 32, so as to make substantially continuous electrical connection between the grid ring 34 of the vacuum tube to the grid sleeve, as required for proper operation at microwave frequencies. In order that the grid sleeve 32 may be of minimum diameter while still accommodating the vacuum tube, the resilient fingers extend inside the grid ring 34, which permits the edge of the grid ring to closely approach the end of the grid sleeve, both axially and radially, thereby leaving only a short gap to be bridged by the contact fingers. Such construction not only permits the greatest possible physical compactness, but also is advantageous from the standpoint of effective electrical path at microwave frequencies.

The same features of construction of the tunable cavity element may be employed to advantage in other types of microwave cavity apparatus. By way of illustration, Fig. 3 shows a wavemeter for frequencies above 1000 mc., wherein the tuning plunger employs a coaxial, integral by-pass capacity that permits the plunger to be adjusted longitudinally while affording substantially uniform terminating characteristics for the plunger within the cavity end wall.

The wavemeter comprises a cavity 150 within cylindrical body 152 having a cap 154. Coupling to the wavemeter cavity is by loop 156 and coaxial connector 158, as in the embodiment of Fig. 1. A crystal rectifier, indicated schematically at 160 with its coupling loop, enables the condition of resonance to be detected in the usual manner, employing a microammeter or the like connected to the rectifier output.

The tuning plunger 164 extends through the end 166 of the wavemeter body, the tuning plunger being integrally formed with or attached to the screw portion of a micrometer 170, the body 172 of which is secured within an enlarged bore in the wavemeter body. Rotation of the micrometer knob 174 thus serves to vary the projection of the plunger 164 within the cavity and thereby change the tuning thereof. Upon the detection of resonance, by maximum reading of the meter or other instrument, the reading may be taken from the micrometer scale and the frequency determined by reference to a calibration chart.

The plunger, instead of sliding directly in the metal body 166, is electrically insulated therefrom by a material such as the tetrafluorethylene polymer (Teflon) employed in the annular types of tuning plungers. Such material, having a dielectric constant of approximately 2, is non-adhering and non-sticking, so as to provide a suitable bearing as well as affording a dielectric medium of the desired electrical properties.

To maintain the insulating bushing or sleeve 180 in position, the inner end of the body 166 is provided with a shoulder 181, while still leaving clearance between the plunger and metallic body. The other end of the bushing is secured by a washer 182 of dielectric material, pressed into place to retain the bushing against outward movement. Clearance may be provided, if desired, between micrometer body 172 and wavemeter body 166 to afford opportunity for relative axial adjustment of the micrometer for initial calibration, after which the parts may be permanently secured.

By way of illustration, for a wavemeter operating in the region 1000–5000 mc., a bushing having a wall thickness of the order of 0.005″ provides a capacity of approximately 15 micromicrofarads, resulting in an impedance of less than about one ohm, which is amply low for effective by-passing of energy. As this low impedance does not vary appreciably over the operating range, the wavemeter, like the cavity oscillator previously described, exhibits substantially uniform performance characteristics over a very substantial frequency range.

While the invention has been described in terms of particular illustrative embodiments in which the features of the invention have been found especially advantageous, it will be understood that the integral coaxial by-pass construction for noncontacting sliding tuning elements in cavity oscillators and the like may be successfully utilized in other types of microwave apparatus. Furthermore, the invention is not to be taken as limited to the disclosed frequency ranges, but comprehends constructions wherein the dielectric thickness and area of juxtaposed surfaces are such as to afford proper impedance characteristics for the desired applications.

I claim:

1. Microwave apparatus comprising concentric members defining elongated coaxial cavities, means for supporting a vacuum tube coaxially at one end of the cavities with an anode ring in contact with an outer concentric member and the grid ring of the vacuum tube adjacent an inner concentric member, a plurality of resilient contact fingers extending from the said concentric member into contact with and inside the periphery of the grid ring of the vacuum tube, an aperture in the said concentric member for feeding energy from an outer cavity to an inner cavity to sustain oscillations, and tuning means for said cavities comprising plungers having annular conductive elements and then dielectric material intermediate said elements and the walls of the cavities and in sliding contact therewith to electrically isolate the conductive plunger elements therefrom while providing a low impedance path to microwave energy.

2. In microwave apparatus having concentric cylindrical members defining anode and cathode cavities, tuning means for said cavities comprising longitudinally adjustable plungers, and vacuum tube mounting means at the ends of the cylindrical members comprising an anode ring contacting means on the cylindrical member for the anode cavity, and grid ring contacting means on the cylindrical member intermediate the anode and cathode cavities, said cylindrical member having an inside diameter slightly greater than the envelope of the vacuum tube and less than the flange of the grid ring thereof, and a plurality of resilient contact fingers extending from said cylindrical member into contact with and underlying the grid ring on the vacuum tube.

3. Microwave apparatus comprising inner, intermediate, and outer coaxial members defining inner and outer coaxial annular cavities having conductive walls, inner and outer annular tuning plungers comprising annular bodies of dielectric material and annular inserts of conductive material exposed at one end of the bodies, the inserts being smaller than the annular cavities to permit dielectric material to extend between and beyond the inserts and the walls, means for supporting the inner and intermediate coaxial members within the outer member comprising a cylindrical body of dielectric material, said body having a portion of reduced diameter, a disc of conductive material on which the intermediate coaxial member is mounted, said disc including a cylindrical portion of conductive material encircling the cylindrical portion of reduced diameter of the dielectric body, means connected to the dielectric body portion of the outer annular tuning plunger in electrically isolated relation to the insert therein for adjusting the axial position of the outer tuning plunger, said means extending through the supporting disc for the intermediate coaxial member in electrically isolated relation thereto, and means independent of the adjusting means for the outer tuning plunger and extending through said supporting disc in electrically isolated relation thereto for adjusting the axial position of the inner tuning plunger.

4. Microwave apparatus comprising inner and outer coaxial members defining a coaxial cavity having conductive walls, a tuning plunger comprising an annular body of dielectric material in slidable contacting relation to the inner and outer members and an annular insert of conductive material smaller than the annular cavity and disposed within the dielectric material and out of contact with the walls of the cavity, the insert having an annular planar face exposed to the cavity and embedded within the dielectric body with dielectric material projecting beyond the exposed planar face at the cavity walls, means supporting the inner coaxial member concentrically within the outer member comprising a cylindrical body of dielectric material secured within the outer member, a disc of conductive material on which the inner coaxial member is mounted, said disc being of lesser diameter than the outer coaxial member and secured to the cylindrical body of dielectric material, and means for adjusting the position of the tuning plunger axially within the cavity comprising a plurality of circumferentially spaced rods secured to the dielectric body of the plunger in electrically isolated relation to the insert therein, apertures in the cylindrical dielectric body, said adjusting rods extending through said body intermediate the inner and outer coaxial members in out of contact relation thereto and to the supporting disc for the inner coaxial member on the cylindrical body.

5. Microwave apparatus comprising inner, intermediate, and outer coaxial members defining inner and outer coaxial annular cavities having conductive walls, inner and outer annular tuning plungers comprising annular bodies of dielectric material and annular inserts of conductive material exposed at one end of the bodies, the inserts being smaller than the annular cavities to permit dielectric material to extend between and beyond the inserts and the walls, means for supporting the inner and intermediate coaxial members within the outer member comprising a cylindrical body of dielectric material, said body having a portion of reduced diameter, a disc of conductive material on which the intermediate coaxial member is mounted, said disc including a cylindrical portion of conductive material encircling the cylindrical portion of reduced diameter of the dielectric body, means connected to the dielectric body portion of the outer annular tuning plunger in electrically isolated relation to the insert therein and extending through the supporting means for the inner and intermediate coaxial members for adjusting the axial position of the outer tuning plunger from outside the cavity, the inner coaxial member extending through the supporting disc for the intercoaxial member in electrically isolated relation thereto and through the dielectric supporting body, said inner coaxial member having a screw-threaded region within the cavity and engaging the dielectric body of the inner tuning plunger in screw-threaded relation for adjusting the position of said tuning plunger by the coaxial member.

References Cited in the file of this patent

UNITED STATES PATENTS

| | | |
|---|---|---|
| 2,235,521 | Higgins | Mar. 18, 1941 |
| 2,419,208 | Frantz et al. | Apr. 22, 1947 |
| 2,428,622 | Gurewitsch | Oct. 7, 1947 |
| 2,443,908 | Gurewitsch | June 22, 1948 |
| 2,446,405 | Bels | Aug. 3, 1948 |
| 2,477,232 | Branson | July 26, 1949 |
| 2,543,721 | Collard et al. | Feb. 27, 1951 |
| 2,617,038 | Russell | Nov. 4, 1952 |
| 2,633,537 | Rambo | Mar. 31, 1953 |
| 2,662,937 | Horwath | Dec. 15, 1953 |
| 2,682,642 | Podolsky | June 29, 1954 |
| 2,736,868 | Bell | Feb. 28, 1956 |
| 2,757,344 | Kostriza et al. | July 31, 1956 |
| 2,786,945 | Lyman | Mar. 26, 1957 |
| 2,790,857 | Gluyas et al. | Apr. 30, 1957 |

UNITED STATES PATENT OFFICE

CERTIFICATE OF CORRECTION

Patent No. 2,922,957 January 26, 1960

Owen I. Haszard

It is hereby certified that error appears in the printed specification of the above numbered patent requiring correction and that the said Letters Patent should read as corrected below.

Column 5, line 73, for "then dielectric material" read -- thin dielectric material --.

Signed and sealed this 2nd day of August 1960.

(SEAL)
Attest:

KARL H. AXLINE
Attesting Officer

ROBERT C. WATSON
Commissioner of Patents